(12) United States Patent
Kauffman et al.

(10) Patent No.: US 8,972,360 B2
(45) Date of Patent: Mar. 3, 2015

(54) POSITION INVARIANT COMPRESSION OF FILES WITHIN A MULTI-LEVEL COMPRESSION SCHEME

(75) Inventors: Steven V. Kauffman, San Jose, CA (US); Rainer Richter, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 13/113,581

(22) Filed: May 23, 2011

(65) Prior Publication Data
US 2012/0303596 A1 Nov. 29, 2012

(51) Int. Cl.
G06F 17/00 (2006.01)
G06F 17/30 (2006.01)

(52) U.S. Cl.
CPC .............................. *G06F 17/30153* (2013.01)
USPC ......................................... 707/693; 704/500

(58) Field of Classification Search
CPC . G06F 8/65; G06F 17/2247; G06F 17/30011; G06F 17/30997
USPC ............ 707/600–831, 899, 999.001–999.206
See application file for complete search history.

(56) References Cited

U.S. PATENT DOCUMENTS

| 4,929,946 | A | 5/1990 | O'Brien et al. |
| 5,097,261 | A | 3/1992 | Langdon, Jr. et al. |
| 5,813,011 | A | 9/1998 | Yoshida et al. |
| 6,112,211 | A | 8/2000 | Bradshaw et al. |
| 6,115,787 | A | 9/2000 | Ohara |
| 6,532,121 | B1 | 3/2003 | Rust et al. |
| 7,043,077 | B2 * | 5/2006 | Rijavec .......................... 382/164 |
| 7,310,629 | B1 * | 12/2007 | Mendelson et al. .................. 1/1 |
| 7,424,482 | B2 | 9/2008 | Kedem et al. |
| 7,636,804 | B2 | 12/2009 | Bolt et al. |
| 7,961,960 | B2 * | 6/2011 | Bashyam et al. ............. 382/232 |
| 2001/0034811 | A1 * | 10/2001 | Basham et al. ................ 711/111 |
| 2004/0179284 | A1 | 9/2004 | Martin |
| 2006/0130046 | A1 * | 6/2006 | O'Neill ......................... 717/168 |
| 2008/0050025 | A1 * | 2/2008 | Bashyam et al. ............. 382/238 |
| 2008/0154928 | A1 * | 6/2008 | Bashyam et al. ............. 707/101 |
| 2008/0281883 | A1 * | 11/2008 | Cannon et al. ................ 707/205 |

OTHER PUBLICATIONS

"Organization of DPX FIles on TAR Tapes", Society of Motion Picture and Television Engineers, Document No. RP 189-1996, Apr. 1, 1996, pp. 1-8.

* cited by examiner

*Primary Examiner* — Angelica Ruiz
(74) *Attorney, Agent, or Firm* — Rabindranath Dutta; Konrad Raynes Davda & Victor LLP

(57) ABSTRACT

An aggregated file is generated, by storing a plurality of initially provided files in a sequence. A computational device executes a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files. The computational device sends the aggregated file to a linear storage device configured to perform a second set of compression operations on the aggregated file.

16 Claims, 6 Drawing Sheets

POSITION INVARIANT COMPRESSION OF FILES WITHIN A MULTI-LEVEL COMPRESSION SCHEME

BACKGROUND

1. Field

The disclosure relates to a method, system, and article of manufacture for position invariant compression of files within a multi-level compression scheme.

2. Background

Data compression is the process of generating compressed data from originally provided data, where the compressed data is represented in fewer bits than the originally provided data. Data uncompression is the process of generating the originally provided data from the compressed data. Data compressions may be performed via compression applications, and data uncompressions may be performed by uncompression applications. The originally provided data may also be referred to as uncompressed data.

Compression of data may be lossless or lossy. Lossless compression may exploit statistical redundancy in the originally provided data. In certain lossless compression mechanism the statistical redundancy may be eliminated or reduced to represent the originally provided data more concisely without any loss of fidelity in the compressed data. Lossy compression is possible if some loss of fidelity in the compressed data is acceptable. Lempel-Ziv (LZ) compression is an example of a lossless compression mechanism, and JPEG compression is an example of a lossy compression mechanism. Data compression has significant value in increasing transfer speeds of the data, and for increasing storage density, i.e., storing the same amount of data in a reduced amount of storage.

File aggregation is a process in which a plurality of files that are to be sent in a single transaction are stored together in an aggregated file. The individual files of the aggregated file may be accessed separately. File aggregation may improve performance by transmitting the aggregated file that includes the plurality of files in a single transaction, instead of transmitting each of the plurality of files one after the other via a plurality of transmissions. File aggregation may be useful for tape storage as it may facilitate the streaming of data to tapes without stopping to write filemarks.

SUMMARY OF THE PREFERRED EMBODIMENTS

Provided are a method, a system, and a computer program product in which an aggregated file is generated, by storing a plurality of initially provided files in a sequence. A computational device executes a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files. The computational device sends the aggregated file to a linear storage device configured to perform a second set of compression operations on the aggregated file.

In additional embodiments, the first set of compression operations perform a lossy or a lossless compression of each of the plurality of files. The second set of compression operations are executed in the linear storage device, to compress the aggregated file having the plurality of compressed files and the predetermined bit patterns, wherein the second set of compression operations perform a lossless compression of the aggregated file.

In yet additional embodiments, a data structure that stores indications of the starting locations is maintained. Contents of the data structure are appended to the aggregated file, and the contents of the data structure are sent to the linear storage device along with the aggregated file.

In further embodiments, the linear storage device is a tape drive, wherein the compressed aggregated file is stored on a tape of the tape drive, wherein a first set of uncompression operations is configurable to uncompress compressions made by the first set of compression operations, and wherein a second set of uncompression operations is configurable to uncompress compressions made by the second set of compression operations. An identification is made of a selected file that is to be recalled from the compressed aggregated file stored on the tape. Data corresponding to the selected file is generated from the compressed aggregated file stored on the tape, by performing the second set of uncompression operations on a portion of the compressed aggregated file, wherein while generating the data a predetermined bit pattern is also restored. The generated data is uncompressed via the first set of uncompression operations to generate the selected file, wherein while uncompressing the generated data the predetermined bit pattern is overwritten, wherein the data structure is used to determine location of the uncompressed generated data, and wherein the uncompressed generated data corresponds to contents of the selected file.

In yet further embodiments, the plurality of initially provided files comprise a first file starting at first location in the aggregated file, and a second file starting at a second location in the aggregated file, wherein the aggregated file comprises the first file and the second file. The first file is compressed to a compressed first file that is stored from the first location, and the second file is compressed to a compressed second file that is stored starting from the second location, wherein the compressed first file is smaller in size by a first number of bits than the first file, and the compressed second file is smaller in size by a second number of bits than the second file. The predetermined bit patterns are stored in the first number of bits of empty space following the compressed first file, and in the second number of bits of empty space following the compressed second file.

BRIEF DESCRIPTION OF THE DRAWINGS

Referring now to the drawings in which like reference numbers represent corresponding parts throughout.

DETAILED DESCRIPTION

Figure 1:
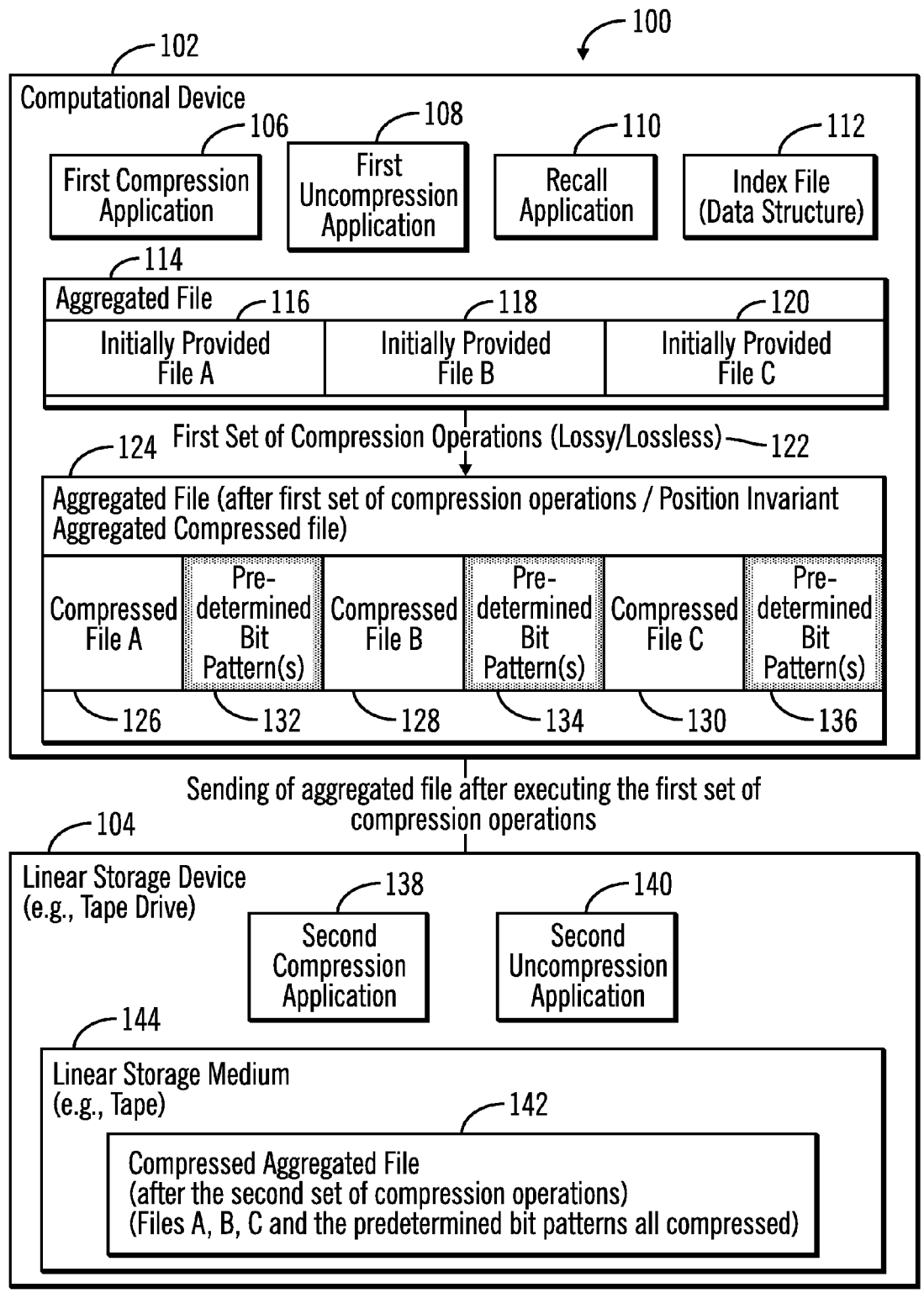
FIG. 1 illustrates a block diagram of a computing environment that includes a computational device coupled to a linear storage device, in accordance with certain embodiments.

In the following description, reference is made to the accompanying drawings which form a part hereof and which illustrate several embodiments. It is understood that other embodiments may be utilized and structural and operational changes may be made.

Combining File Aggregation with Data Compression

An efficient implementation of file aggregation may require access to individual files within the aggregated file to prevent the entire aggregated file from having to be recalled to extract a single file. Since data compression may result in the rearrangement of the data, file aggregation and data compression may sometimes be incompatible. Once an aggregated file is compressed, the start locations of individual files within the aggregated file are different from the start locations of the individual files in the aggregated file prior to compression. Compression may have to be disabled if access to individual files within the aggregated file is to be allowed.

However, for storing certain voluminous types of data, such as feature films, compression is extremely useful. Feature films are typically 24 frames per second and successive frames often differ very little in content. Data compression may be preferable when common patterns can be identified and substituted with shorter patterns. Aggregating a set of these similar files may enable a higher compression ratio like those found in MPEG2 and other stream based systems. However in doing so, the boundaries of the original files are lost and the entire compressed aggregation may have to be read to enable access to any single file. Tape solution architects may therefore be faced with a tradeoff between compression, which can boost speeds and capacity, and optimal content access via seek and partial object recall, which can boost recall times by possibly a hundred times or more depending on the size of the aggregation.

Certain embodiments provide a mechanism for a multi-level data compression while at the same time retaining the ability to access individual files within the aggregated file. Originally provided individual files that are stored within an aggregated file are compressed in place via a first set of compression operations. Each of the compressed individual files is smaller in size than the corresponding originally provided individual file. However the starting location of a compressed individual file within the aggregated file remains the same as the starting location of the originally provided individual file within the aggregated file. The empty space that follows each of the compressed individual files as a result of the first set of compression operations is filled with a set of predetermined bits that can be efficiently compressed via any lossless compression mechanism. The aggregated file in which the individual files are compressed is then transmitted to a tape drive and pointers to the starting locations of the individual files are maintained.

The aggregated file is received by a tape drive and a second set of compression operations are performed on the aggregated file to generate a compressed aggregated file on the tape. Since the predetermined bits are efficiently compressed the size of the compressed aggregated file is relatively small. The second set of compression operations may be lossless. In certain embodiments, recall of an individual file is possible without any need to uncompress all the individual files because the pointers to the starting locations of the individual files are maintained.

In certain embodiments, after the second set of compression operations, the locations of the original files do not change, in so far as visibility to the users of the tape drive is concerned. Therefore on a recall, the entire compressed aggregated file on the tape does not have to be uncompressed, and only the subset or portion which corresponds to the original file has to be uncompressed.

Exemplary Embodiments

FIG. 1 illustrates block diagram of a computing environment 100 that includes a computational device 102 coupled to a linear storage device 104, in accordance with certain embodiments. The computational device 102 may comprise any suitable computational device including those presently known in the art, such as, a personal computer, a workstation, a server, a mainframe, a hand held computer, a palm top computer, a telephony device, a network appliance, a blade computer, a server, etc. The linear storage device 102 may comprise any storage device in which data is stored linearly in a storage medium. For example, in certain embodiments the linear storage device 102 may comprise a tape drive and the storage medium may comprise a tape. The linear storage device 102 may support Linear Tape-Open (or LTO), Digital Linear Tape (DLT) or other types of storage technology. The computational device 102 and the linear storage device 104 may be coupled directly or via a network, such as a storage area network, the Internet, a local area network, etc. While a single computational device 102 and a single linear storage device 104 has been shown in FIG. 1, in alternative embodiments a plurality of computational devices may be coupled to a plurality of linear storage devices.

A first compression application 106, a first uncompression application 108 and a recall application 110 may be implemented in the computational device 102. A data structure, such as an index file 112, may also be implemented within the computational device 102.

An aggregated file 114 may be stored in the computational device 102. In an example shown in FIG. 1, the aggregated file 114 is comprised of three files A, B, C (shown via reference numerals 116, 118, 120) that are stored sequentially one after the other. For example, file B 118 may be stored immediately adjacent to file A 116, and file C 120 may be stored immediately adjacent to file B 118. The three files A, B, C (shown via reference numerals 116, 118, 120) may have been provided initially by one or more users or administrators.

The first compression application 106 may perform a first set of compression operations 122 on the aggregated file 114 to generate a position invariant aggregated compressed file 124. In the position invariant aggregated compressed file 124 each of the initially provided files A, B, C (shown via reference numerals 116, 118, 120) have been compressed via a lossy or a lossless compression mechanism to generate compressed file A 126, compressed file B 128, and compressed file C 130. For example, compressed file A 126 is generated by compressing initially provided file 116, compressed file B 128 is generated by compressing initially provided file 118, and compressed file C 130 is generated by compressing initially provided file 120. Other compression mechanisms are also possible to generate the compressed files A, B, C 126, 128, 130. The individual compressed files 126, 128, 130 in the position invariant compressed file 124 have the same position as the corresponding initially provided files 116, 118, 120 in the aggregated file 114. For example in certain embodiments, to compress the aggregated file 114, the initially provided file 116 is compressed to generate the compressed file A 126. However, since the size of the compressed file A 126 is smaller than the initially provided file A 116, a set of predetermined bit patterns 132 is appended at the end of the compressed file A 126, such that the combined size of the compressed file 126 and the set of predetermined bit patterns 132 is the same as the size of the initially provided file A 116. Similarly, a set of predetermined bit patterns 134 may be appended at the end of compressed file B 128, and a set of predetermined bit patterns 136 may be appended at the end of compressed file C 130. In certain embodiments, the aggregated file 114 is replaced by the position invariant compressed file 124 after the first set of compression operations 122. The set of predetermined bit patterns may comprise repetitive bit patterns. The computational device 102 then transmits the position invariant aggregated compressed file 124 in a single transaction to the linear storage device 104.

In certain embodiments, the index file 112 stores indications of the starting position of each of the compressed files A, B, C (reference numerals 126, 128, 130). The index file 112 may also optionally store indications of compression mechanisms utilized to perform compression within the computational device 102.

The linear storage device 104 has a second compression application 138 and a second uncompression application 140 implemented within the linear storage device 104. The second compression application 138 applies a second set of compression operations to compress the received position invariant aggregated file 122 to generate a compressed aggregated file 142 for storage in a linear storage medium 144 within the linear storage device 104. The second set of compression operations performed by the second compression application 138 comprises a lossless compression mechanism, and in certain embodiments may be provided by the manufacturer of the linear storage device 104.

The compressed files A, B, C, 126, 128, 130 and the set of predetermined bit patterns 132, 134, 136 all undergo the second set of compression operations within the linear storage device 104. In certain embodiments, the predetermined bit patterns may have been chosen such that they are relatively easy to compress by mechanisms such as run length encoding. For example, if the same pattern is repeated many times (e.g., hundreds of thousands of times) within the set of predetermined bit patterns 132, 134, 136 then instead of storing the entire string the comprises the predetermined bit patterns 132, 134, 136, the number of occurrences of the same pattern and appropriate locations may be stored in a compressed format after the second set of compression.

The recall application 110 may recall an individual file (such as file A 116) from the compressed aggregated file 142 stored in the linear storage medium 144 by first initiating the usage of the second uncompression application 140 to uncompress the compressed aggregated file 142, and then initiating the usage of the first uncompression application 108 to locate the individual file. Since the position invariant compression performed by the first set of compression operations 122 does not change the starting positions of the individual files, the individual files may be retrieved even after the file aggregation and compressions.

Alternatively, the index file 112 may be used to identify a specific range of bytes, typically a byte offset and length, to be recalled. The second uncompression application 140 recalls from the compressed aggregated file 142 only those bytes necessary to satisfy the request. Since the position invariant compression performed by the first set of compression operations 122 does not change the starting positions of the individual files, the second uncompression application 140 can locate the files within the compressed aggregate file.

Figure 2:
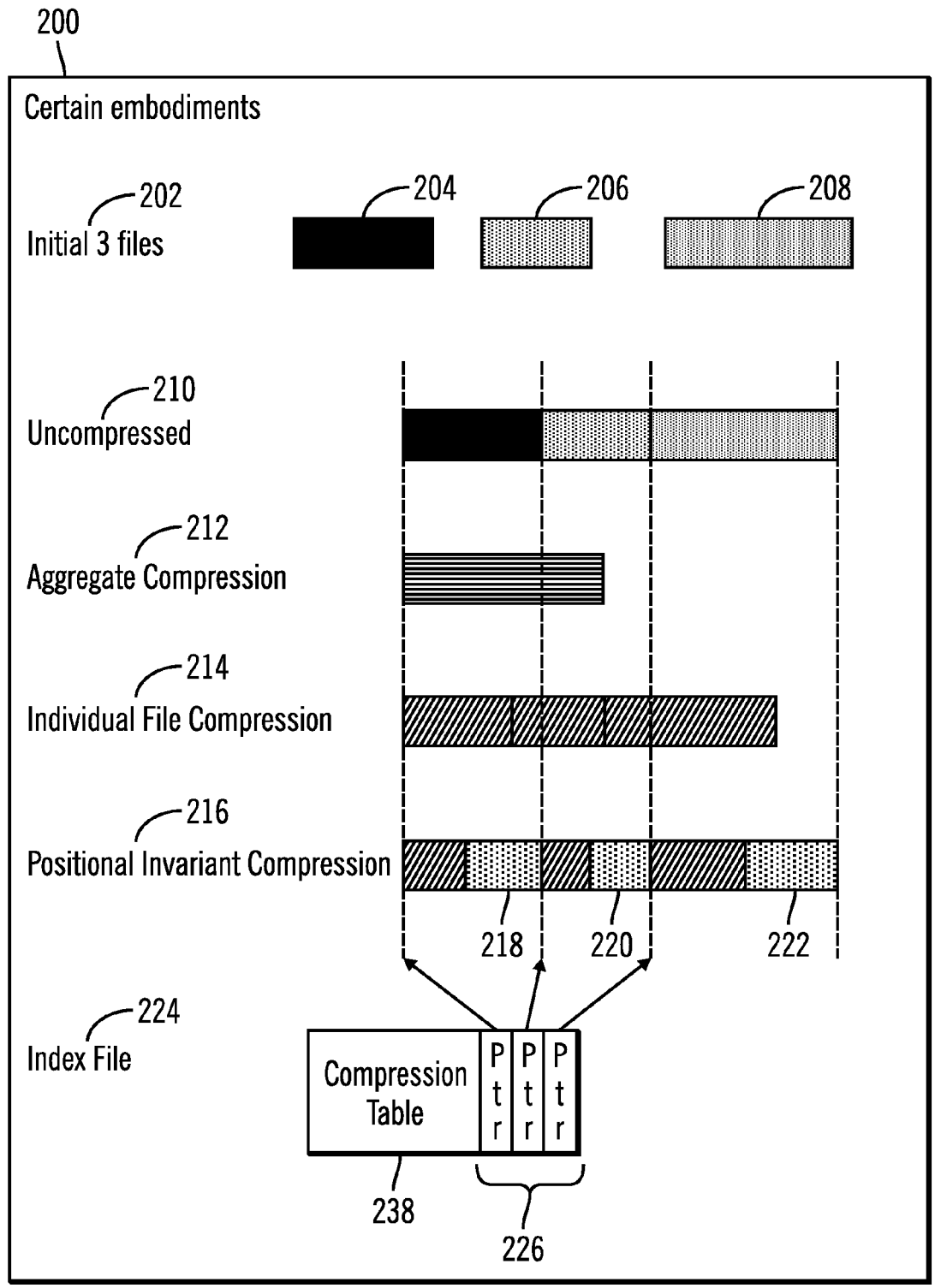
FIG. 2 illustrates a block diagram that shows how a position invariant compression is performed, in accordance with certain embodiments.

FIG. 2 illustrates a block diagram 200 that shows how a position invariant compression is performed, in accordance with certain embodiments. Initially a set of three files are provided (reference numeral 202), where the individual files are 204, 206, 208.

If the three files 204, 206, 208 are placed sequentially then the uncompressed version 210 of an aggregated file is formed. The uncompressed data 210 takes up the most space but the locations of the files are known and indicated by the dashed vertical lines. Any file is individually accessible via a seek to its start position and a subsequent read operation.

If the uncompressed version 210 of the aggregated file is compressed without individually compressing each of the three files 204, 206, 210, then the aggregated file that may be formed is shown as the aggregated compression file 212. An aggregated compressed file may take up a minimal amount of space, but the individual file boundaries are no longer known. To retrieve a file's data, the aggregate compressed file may have to be read and processed from the beginning of the aggregated compressed file to the location of the file.

If the uncompressed version 210 of the aggregated file is compressed by individually compressing each of the three files 204, 206, 210, then the aggregated file that may be formed is shown as the individual file compression 214. Using individual file compression, a new set of file boundaries can be created and stored.

It may be observed that in both aggregate compression 212, and individual file compression 214, the starting position of the individual files in the uncompressed version 210 of the individual files are not retained. In position invariant compression 216, the appending of the set of predetermined bit patterns 218, 220, 222 to the compressed individual files causes the starting position of the individual files to be retained and may also be stored in an index file 224 via pointers 226 to the starting positions.

FIG. 2 is a schematic diagram, and the compression mechanisms for the individual file compression 214 may be different from the compression mechanism of the position invariant compression 216, and a compression table 238 that allows uncompression to be performed based on the compression mechanism employed may be stored in the index file 224. Using position invariant compression, the files can be compressed more efficiently at a later stage, saving more space than individual file compression. In the later stage, low level tape drive compression may greatly reduce the predetermined bit patterns and enable a significant increase in transfer rates to and from the tape drive.

Therefore, FIG. 2 illustrates certain embodiments in which a position invariant compression 216 is performed on an aggregated file, where the position invariant compression 216 causes each of the individual files within the aggregated file to retain the position that the individual file was stored in prior to the position invariant compression. Each of the individual compressed files is appended with a set of predetermined bit patterns that is relatively easy to compress because of the predetermined bits within the patterns.

Figure 3:
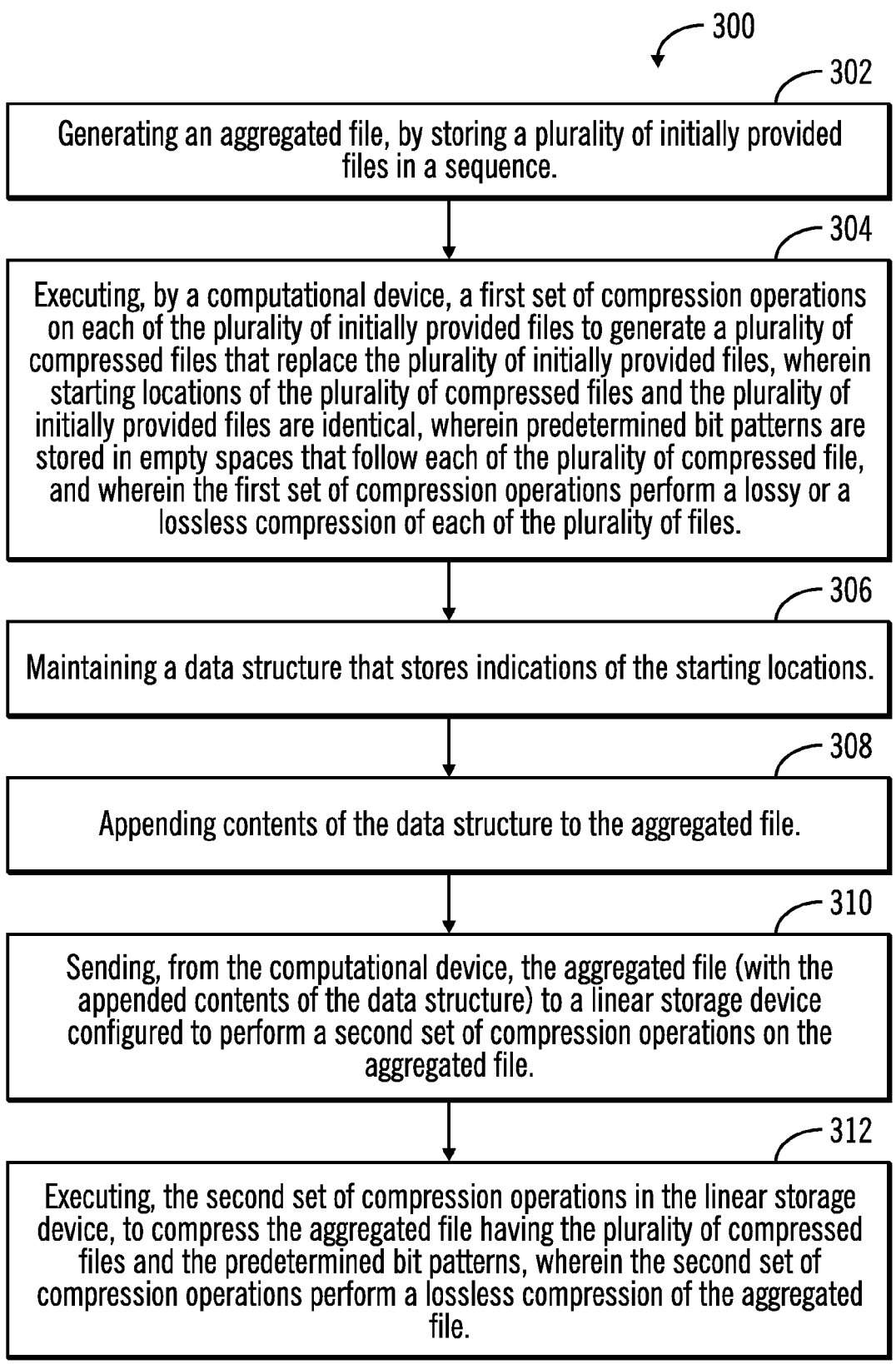
FIG. 3 illustrates a first flowchart that shows certain operations, in accordance with certain embodiments.

FIG. 3 illustrates a first flowchart 300 that shows certain operations, in accordance with certain embodiments. The operations shown in FIG. 3 may be implemented in the computing environment 100, within the computational device 102 and the linear storage device 104.

Control starts at block 302, in which an aggregated file 114 is generated, by storing a plurality of initially provided files 116, 118, 120 in a sequence. The computational device 102 executes (at block 304) a first set of compression operations 122 on each of the plurality of initially provided files 116, 118, 120 to generate a plurality of compressed files 126, 128, 130 that replace the plurality of initially provided files 116, 118, 120, wherein starting locations of the plurality of compressed files and the plurality of initially provided files are identical, wherein predetermined bit patterns 132, 134, 136 are stored in empty spaces that follow each of the plurality of compressed files, and wherein the first set of compression operations perform a lossy or a lossless compression of each of the plurality of files 116, 118, 120.

Control proceeds to block 306 in which a data structure 112 that stores indications of the starting locations is maintained. In certain embodiments, the contents of the data structure 112 are appended (at block 308) to the aggregated file 124 (i.e., the position invariant compressed aggregated file) and the contents of the data structure 112 may be used for uncompression via indications stored in a compression table 238 while determining the start position of an individual file. In certain embodiments, the contents of the data structure 112 are not appended to the aggregated file 124.

The computational device 102 sends (at block 310) the aggregated file 124 (with or without the appended contents of the data structure 112) to a linear storage device 104 configured to perform a second set of compression operations on the aggregated file 124. The second set of compression operations are executed (at block 312) in the linear storage device 104, to compress the aggregated file 124 having the plurality of compressed files 126, 128, 130 and the predetermined bit patterns 132, 134, 136, wherein the second set of compression operations perform a lossless compression of the aggregated file.

Therefore, FIG. 3 illustrates how compression in performed in two levels. In a first level that is performed in computational device 102, a position invariant aggregated file is generated. In a second level, the transmitted position invariant aggregated file is compressed within a linear storage device 104. The generation of the position invariant aggregated file allows both file aggregation and file compression to be performed.

Figure 4:
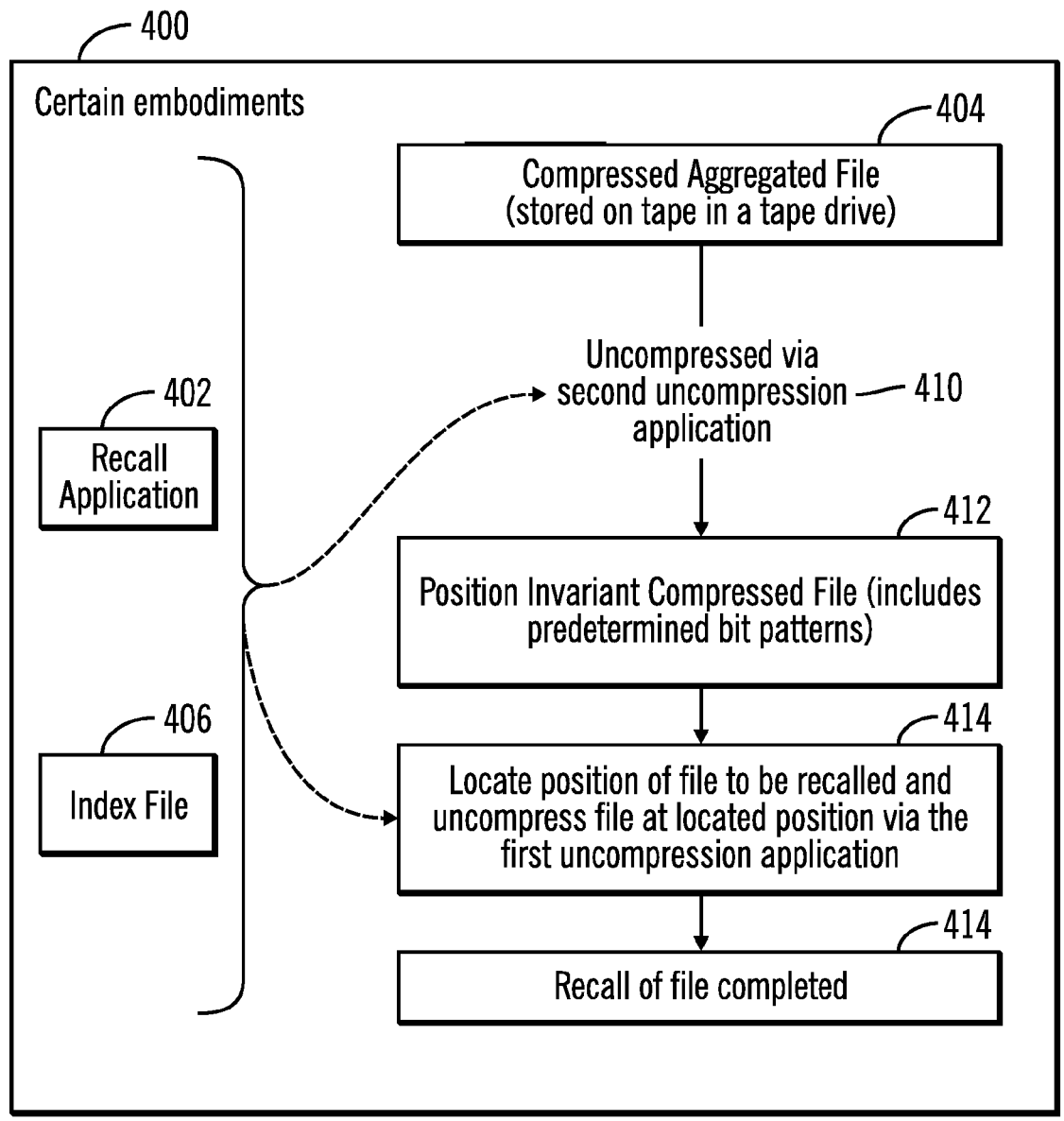
FIG. 4 illustrates a block diagram that shows how a recall application recalls a selected file from a tape, in accordance with certain embodiments.

FIG. 4 illustrates a block diagram 400 that shows how a recall application 402 recalls a selected file from a tape drive 104, in accordance with certain embodiments. A compressed aggregated file 404 that has been generated by two levels of compression is stored in the tape 144 on the tape drive 104. The recall application 402, in association with the index file 406, initiates an uncompression 410 of specific portion(s) of the compressed aggregated file 404, via the second uncompression application 140, to generate a position invariant compressed file 412 that includes data compressed via the first compression followed by a predetermined bit pattern. Additionally, the recall application 402 in association with the index file 406 locates the position of the file to be recalled via pointers, and a file is uncompressed at the located position via the first uncompression application 108 (at block 414). The uncompressed file at the located position is recalled (at block 414). It should be noted that individual file access can occur on both levels, both on the tape and then in the compressed file. In certain embodiments partial files can be accessed on the tape.

Figure 5:
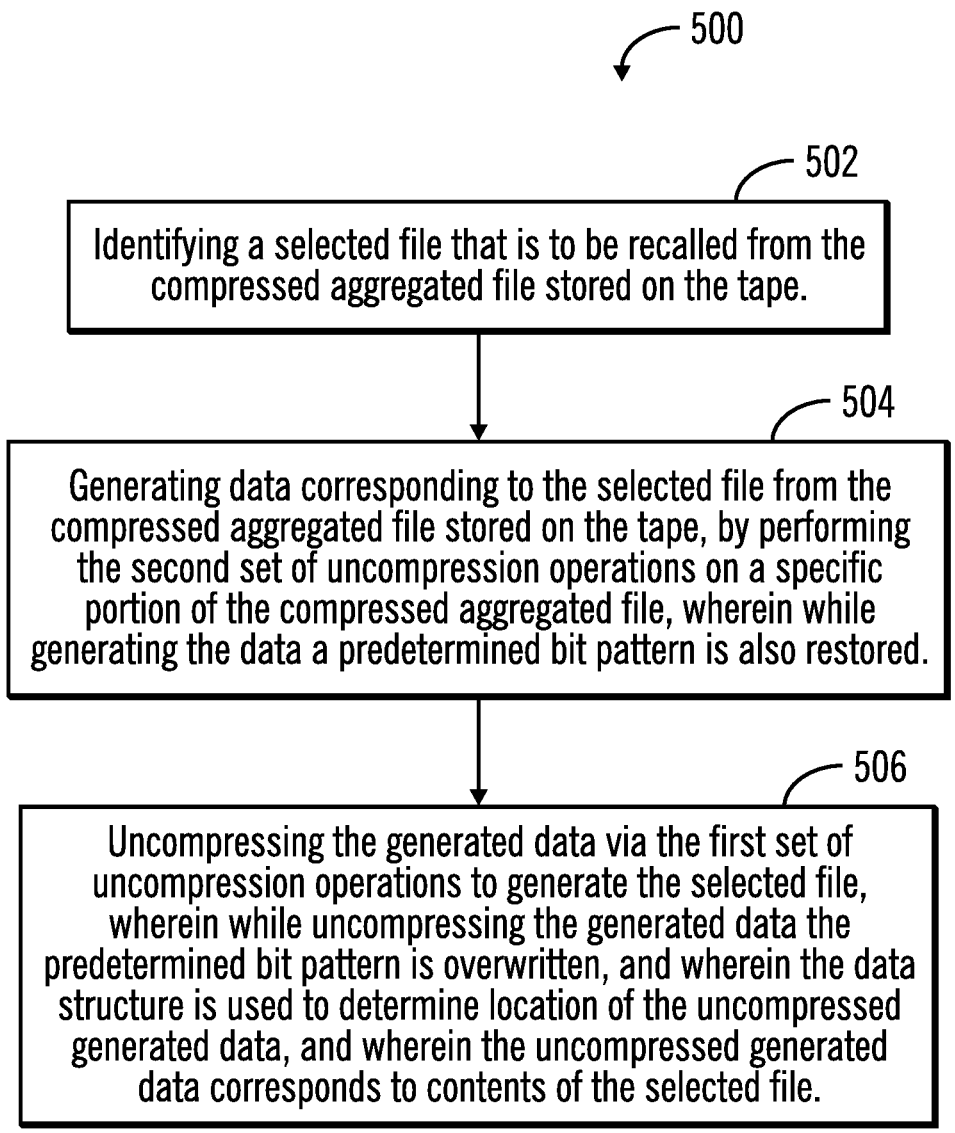
FIG. 5 illustrates a second flowchart that shows certain operations, in accordance with certain embodiments.

FIG. 5 illustrates a second flowchart 500 that shows certain operations, in accordance with certain embodiments. The operations shown in FIG. 5 may be implemented in the computing environment 100 within the computational device 102 and the linear storage device 104. A compressed aggregated file 404 that has been generated by two levels of compression is stored in the tape.

Control starts at block 502, in which an identification is made of a selected file that is to be recalled from the compressed aggregated file 142 stored on the tape 144. Data corresponding to the selected file is generated (at block 504) from the compressed aggregated file 142 stored on the tape 144, by performing the second set of uncompression operations on a specific portion of the compressed aggregated file 142 which corresponds to the selected file, wherein while generating the data a predetermined bit pattern is also restored. The specific portion may compromise the entire file if all the files in the compressed aggregated file 142 are requested.

The generated data is uncompressed (at block 506) via the first set of uncompression operations to generate the selected file, wherein while uncompressing the generated data the predetermined bit pattern is overwritten. The data structure 112 is used to determine location of the uncompressed generated data, and the uncompressed generated data corresponds to contents of the selected file.

Therefore, FIGS. 1-5 illustrate certain embodiments in which both file compression and file aggregation are performed in a multi-level compression mechanism. In a first level compression mechanism a position invariant compression is performed within a computational device. The compressed aggregated file is transmitted to a linear storage device to undergo a second level of compression. Two levels of uncompression cause a file to be recalled from the linear storage device. In such embodiments both compression and aggregation may be performed on a set of files.

In certain embodiments, both bandwidth of transmission and storage capacity may be utilized more effectively by performing aggregation with compression. On tape, space may be conserved. Read and write bandwidth is increased and yet any file can be accessed via a seek to its original location in the aggregated file. The file may appear to be in the same place, but in reality the tape drive may have moved the data in a standards based manner transparent to a higher level application. The data is still accessible via its original location data and the tape drive manages the appropriate remapping to blocks on tape.

Certain embodiments may be used in fifth generation LTO and the associated Durabytes format because such fifth generation LTO already has the concept of an external index. The external index can be used to accommodate the compression table. This ensures that the data itself will always be equal to or smaller than the original.

In certain embodiments, file aggregations can be selected for compressibility. For instance, scene detection software can identify groups of pictures suited to a high level compression algorithm. Multiple compression tables can be calculated which may enable more efficient compression as each file can use the table most effective for the file. Parallel processing can enable each file to be quickly checked against all current compression tables to find the best match. The optimal table is used and the choice may be retained in the aggregate file's index file.

In certain embodiments, the compression table must be stored external to the aggregated file or appended to the aggregated file. Files can grow during compression when the size of the table exceeds the amount of compression. By storing the table externally or appending it, the compressed data will always be smaller than its original size.

In certain embodiments, the predetermined bit patterns are highly compressible by the storage device which increases storage density and bandwidth. Individual files are accessible at their original start locations despite being compressed. This enables efficient data storage while retaining the benefits of partial file recall.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
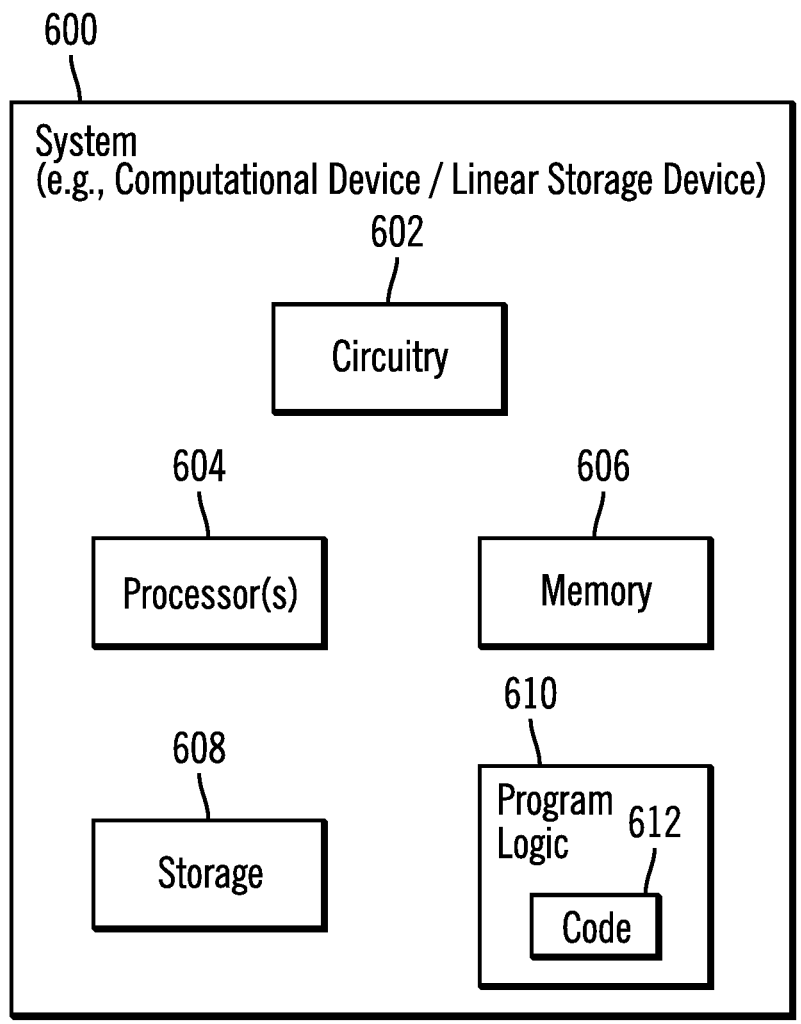
FIG. 6 illustrates a block diagram of a computational system that shows certain elements that may be included in the computational device or the linear storage device of FIG. 1, in accordance with certain embodiments.

FIG. 6 illustrates a block diagram that shows certain elements that may be included in the computational device 102 or the linear storage device 104 in accordance with certain embodiments. The system 600 may comprise the computational device 102 or the linear storage device 104 and may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   generating an aggregated file, by storing a plurality of initially provided files in a sequence;
   executing, by a computational device, a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files;
   sending, from the computational device, the aggregated file to a linear storage device configured to perform a second set of compression operations on the aggregated file, wherein the compressed aggregated file is stored in the linear storage device, the method further comprising:
   identifying a selected file that is to be recalled from the compressed aggregated file stored on the linear storage device;
   generating data corresponding to the selected file from the compressed aggregated file stored on linear storage device, by performing uncompression operations on a portion of the compressed aggregated file, wherein while generating the data a predetermined bit pattern is also restored; and
   uncompressing the generated data via additional uncompression operations to generate the selected file and overwriting the predetermined bit pattern.

2. The method of claim 1, wherein the first set of compression operations perform a lossy or a lossless compression of each of the plurality of files, wherein the second set of compression operations are executed in the linear storage device, to compress the aggregated file having the plurality of compressed files and the predetermined bit patterns, wherein the second set of compression operations perform a lossless compression of the aggregated file, wherein a data structure that stores indications of the starting locations is maintained, wherein contents of the data structure are appended to the aggregated file, and the contents of the data structure are sent to the linear storage device along with the aggregated file, wherein the linear storage device is a tape drive, wherein the compressed aggregated file is stored on a tape of the tape drive, wherein a first set of uncompression operations is configurable to uncompress compressions made by the first set of compression operations, and wherein a second set of uncompression operations is configurable to uncompress compressions made by the second set of compression operations.

3. A method, comprising:
   generating an aggregated file, by storing a plurality of initially provided files in a sequence;
   executing, by a computational device, a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files;

sending, from the computational device, the aggregated file to a linear storage device configured to perform a second set of compression operations on the aggregated file, wherein the plurality of initially provided files comprise a first file starting at first location in the aggregated file, and a second file starting at a second location in the aggregated file;

the first file is compressed to a compressed first file that is stored from the first location, and the second file is compressed to a compressed second file that is stored starting from the second location;

the predetermined bit patterns are stored in a first number of bits of empty space following the compressed first file, and in a second number of bits of empty space following the compressed second file.

4. The method of claim 3,
wherein the compressed first file is smaller in size by a first number of bits than the first file, and the compressed second file is smaller in size by a second number of bits than the second file.

5. A system, comprising:
a memory; and
a processor coupled to the memory, wherein the processor performs operations, the operations comprising:
generating an aggregated file, by storing a plurality of initially provided files in a sequence;
executing, by a computational device, a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files;
sending, from the computational device, the aggregated file to a linear storage device configured to perform a second set of compression operations on the aggregated file, wherein the compressed aggregated file is stored in the linear storage device, the operations further comprising:
identifying a selected file that is to be recalled from the compressed aggregated file stored on the linear storage device;
generating data corresponding to the selected file from the compressed aggregated file stored on linear storage device, by performing uncompression operations on a portion of the compressed aggregated file, wherein while generating the data a predetermined bit pattern is also restored; and
uncompressing the generated data via additional uncompression operations to generate the selected file and overwriting the predetermined bit pattern.

6. The system of claim 5, wherein the first set of compression operations perform a lossy or a lossless compression of each of the plurality of files, wherein the second set of compression operations are executed in the linear storage device, to compress the aggregated file having the plurality of compressed files and the predetermined bit patterns, wherein the second set of compression operations perform a lossless compression of the aggregated file, wherein a data structure that stores indications of the starting locations is maintained, wherein contents of the data structure are appended to the aggregated file, and the contents of the data structure are sent to the linear storage device along with the aggregated file, wherein the linear storage device is a tape drive, wherein the compressed aggregated file is stored on a tape of the tape drive, wherein a first set of uncompression operations is configurable to uncompress compressions made by the first set of compression operations, and wherein a second set of uncompression operations is configurable to uncompress compressions made by the second set of compression operations.

7. A system, comprising:
a memory; and
a processor coupled to the memory, wherein the processor performs operations, the operations comprising:
generating an aggregated file, by storing a plurality of initially provided files in a sequence;
executing, by a computational device, a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files;
sending, from the computational device, the aggregated file to a linear storage device configured to perform a second set of compression operations on the aggregated file, wherein
the plurality of initially provided files comprise a first file starting at first location in the aggregated file, and a second file starting at a second location in the aggregated file;
the first file is compressed to a compressed first file that is stored from the first location, and the second file is compressed to a compressed second file that is stored starting from the second location;
the predetermined bit patterns are stored in a first number of bits of empty space following the compressed first file, and in a second number of bits of empty space following the compressed second file.

8. The system of claim 7,
wherein the compressed first file is smaller in size by a first number of bits than the first file, and the compressed second file is smaller in size by a second number of bits than the second file.

9. A computer program product, the computer program product comprising:
a non-transitory computer readable storage medium having computer readable program code embodied therewith, the computer readable program code configured to perform operations, the operations comprising:
generating an aggregated file, by storing a plurality of initially provided files in a sequence;
executing, by a computational device, a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files;
sending, from the computational device, the aggregated file to a linear storage device configured to perform a second set of compression operations on the aggregated file, wherein the compressed aggregated file is stored in the linear storage device, the operations further comprising:
identifying a selected file that is to be recalled from the compressed aggregated file stored on the linear storage device;

generating data corresponding to the selected file from the compressed aggregated file stored on linear storage device, by performing uncompression operations on a portion of the compressed aggregated file, wherein while generating the data a predetermined bit pattern is also restored; and uncompressing the generated data via additional uncompression operations to generate the selected file and overwriting the predetermined bit pattern.

10. The computer program product of claim 9, wherein the first set of compression operations perform a lossy or a lossless compression of each of the plurality of files, wherein the second set of compression operations are executed in the linear storage device, to compress the aggregated file having the plurality of compressed files and the predetermined bit patterns, wherein the second set of compression operations perform a lossless compression of the aggregated file, wherein a data structure that stores indications of the starting locations is maintained, wherein contents of the data structure are appended to the aggregated file, and the contents of the data structure are sent to the linear storage device along with the aggregated file, wherein the linear storage device is a tape drive, wherein the compressed aggregated file is stored on a tape of the tape drive, wherein a first set of uncompression operations is configurable to uncompress compressions made by the first set of compression operations, and wherein a second set of uncompression operations is configurable to uncompress compressions made by the second set of compression operations.

11. A computer program product, the computer program product comprising:

a non-transitory computer readable storage medium having computer readable program code embodied therewith, the computer readable program code configured to perform operations, the operations comprising:

generating an aggregated file, by storing a plurality of initially provided files in a sequence;

executing, by a computational device, a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files;

sending, from the computational device, the aggregated file to a linear storage device configured to perform a second set of compression operations on the aggregated file, wherein the plurality of initially provided files comprise a first file starting at first location in the aggregated file, and a second file starting at a second location in the aggregated file;

the first file is compressed to a compressed first file that is stored from the first location, and the second file is compressed to a compressed second file that is stored starting from the second location;

the predetermined bit patterns are stored in a first number of bits of empty space following the compressed first file, and in a second number of bits of empty space following the compressed second file.

12. The computer program product of claim 11, wherein the compressed first file is smaller in size by a first number of bits than the first file, and the compressed second file is smaller in size by a second number of bits than the second file.

13. A method for deploying computing infrastructure, comprising integrating computer-readable code into a computational system, wherein the code in combination with the computational system performs operations, the operations comprising:

generating an aggregated file, by storing a plurality of initially provided files in a sequence;

executing, by a computational device, a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files;

sending, from the computational device, the aggregated file to a linear storage device configured to perform a second set of compression operations on the aggregated file, wherein the compressed aggregated file is stored in the linear storage device, the operations further comprising:

identifying a selected file that is to be recalled from the compressed aggregated file stored on the linear storage device;

generating data corresponding to the selected file from the compressed aggregated file stored on linear storage device, by performing uncompression operations on a portion of the compressed aggregated file, wherein while generating the data a predetermined bit pattern is also restored; and uncompressing the generated data via additional uncompression operations to generate the selected file and overwriting the predetermined bit pattern.

14. The method for deploying computing infrastructure of claim 13, wherein the first set of compression operations perform a lossy or a lossless compression of each of the plurality of files, wherein the second set of compression operations are executed in the linear storage device, to compress the aggregated file having the plurality of compressed files and the predetermined bit patterns, wherein the second set of compression operations perform a lossless compression of the aggregated file, wherein a data structure that stores indications of the starting locations is maintained, wherein contents of the data structure are appended to the aggregated file, and the contents of the data structure are sent to the linear storage device along with the aggregated file, wherein the linear storage device is a tape drive, wherein the compressed aggregated file is stored on a tape of the tape drive, wherein a first set of uncompression operations is configurable to uncompress compressions made by the first set of compression operations, wherein a second set of uncompression operations is configurable to uncompress compressions made by the second set of compression operations.

15. A method for deploying computing infrastructure, comprising integrating computer-readable code into a computational system, wherein the code in combination with the computational system performs operations, the operations comprising:

generating an aggregated file, by storing a plurality of initially provided files in a sequence;

executing, by a computational device, a first set of compression operations on each of the plurality of initially provided files to generate a plurality of compressed files that replace the plurality of initially provided files, wherein starting locations of the plurality of compressed files and the plurality of initially provided files are identical, and wherein predetermined bit patterns are stored in empty spaces that follow each of the plurality of compressed files;

sending, from the computational device, the aggregated file to a linear storage device configured to perform a second set of compression operations on the aggregated file, wherein the plurality of initially provided files comprise a first file starting at first location in the aggregated file, and a second file starting at a second location in the aggregated file;

the first file is compressed to a compressed first file that is stored from the first location, and the second file is compressed to a compressed second file that is stored starting from the second location;

the predetermined bit patterns are stored in a first number of bits of empty space following the compressed first file, and in a second number of bits of empty space following the compressed second file.

16. The method for deploying computing infrastructure of claim 15, wherein the compressed first file is smaller in size by a first number of bits than the first file, and the compressed second file is smaller in size by a second number of bits than the second file.

* * * * *